US012617108B2

(12) United States Patent
Ferchaud

(10) Patent No.: US 12,617,108 B2
(45) Date of Patent: May 5, 2026

(54) FOAM BOARD CUTTER

(71) Applicant: SLICE, INC., Sunny Isles, FL (US)

(72) Inventor: Joshua Ferchaud, Redding, CA (US)

(73) Assignee: Slice Safety Cutter, Inc., Irvine, CA (US)

( * ) Notice: Subject to any disclaimer, the term of this patent is extended or adjusted under 35 U.S.C. 154(b) by 585 days.

(21) Appl. No.: 18/051,700

(22) Filed: Nov. 1, 2022

(65) Prior Publication Data

US 2024/0139977 A1 May 2, 2024

(51) Int. Cl.
*B26B 5/00* (2006.01)

(52) U.S. Cl.
CPC .............. *B26B 5/001* (2013.01); *B26B 5/003* (2013.01); *B26B 5/005* (2013.01)

(58) Field of Classification Search
CPC ................................. B26B 1/08; B26B 5/001; B26B 5/002; B26B 29/02; B23D 51/10
See application file for complete search history.

(56) References Cited

U.S. PATENT DOCUMENTS

| | | | | |
|---|---|---|---|---|
| 3,448,518 A * | 6/1969 | Sklar | B26B 5/002 | 30/162 |
| 4,578,865 A * | 4/1986 | Keller | B26B 5/008 | 30/162 |
| 5,337,481 A * | 8/1994 | Mears | B26B 5/008 | 30/162 |
| 5,584,123 A * | 12/1996 | Chi | B26B 11/00 | 30/162 |
| 8,069,571 B2 * | 12/2011 | Chung | B26B 5/00 | 30/162 |
| 9,656,398 B2 * | 5/2017 | Wang | B26B 5/001 | |

FOREIGN PATENT DOCUMENTS

| | | | | |
|---|---|---|---|---|
| DE | 202019005077 U1 * | 2/2020 | | |
| GB | 1522454 A * | 8/1978 | | B26B 5/002 |
| KR | 20190034411 A * | 4/2019 | | |

* cited by examiner

*Primary Examiner* — Jennifer S Matthews
(74) *Attorney, Agent, or Firm* — Sigma Law Group LLC; James Smedley; Alex Korona

(57) ABSTRACT

A foam board cutter configured with dual retractable cutting blades that may be extended and retracted by dual blade actuation mechanisms which may be parallel to one another and independently operable. Each blade actuation mechanism of the cutter may include a slider button assembly operably connected to a blade holder configured to hold a blade.

17 Claims, 7 Drawing Sheets

FOAM BOARD CUTTER

FIELD OF THE INVENTION

The present invention generally relates to a foam board cutter with dual retractable cutting blades. Specifically, embodiments of the present invention relate to a foam board cutter apparatus with one or more retracting blade cartridges, including embodiments where dual cutting blades are disposed on corresponding dual blade cartridges which may be manually retracted by a user when corresponding dual slider switches are moved.

BACKGROUND

Foam board cutters may be designed in a variety of configurations and include any number of features to improve the safety and ergonomics of the tool. However, currently available foam board cutters are not provided with dual, parallel blades which are independently operable and are able to function side-by-side and simultaneously with one another. Moreover, currently available foam board cutters are not configured for ambidextrous use and lack the ability to make 45° cuts in two directions utilizing one of the dual blades. Therefore, there is a need in the art for a foam board cutter that comprises dual blades that are independently operable, parallel, and are able to function side-by-side with one another and optionally permits 45° cuts in two directions utilizing one of the dual blades.

These and other features and advantages of the present invention will be explained and will become obvious to one skilled in the art through the summary of the invention that follows.

SUMMARY OF THE INVENTION

Accordingly, it is an aspect of the present invention to provide a foam board cutter with a dual blade cartridge assembly to enable dual cutting. Each blade cartridge assembly may comprise its own blade holder, blade, and slider button assembly. Having a dual blade cartridge assembly may enable independent operation of each blade. However, one or both blades may be utilized at any given time. Furthermore, it is an aspect of the present invention to provide a blade cartridge assembly that is removable to allow for the replacement of blades. The blade cartridge assemblies may be configured within a first and second housing shells and sealed with a cap. The cap may optionally be locked in at least primary and secondary modes.

According to an embodiment of the present invention, a foam board cutter may comprise a first blade cartridge assembly configured in parallel position to a second blade cartridge assembly, wherein each blade cartridge assembly comprises a blade holder and a blade. According to certain embodiments, each blade cartridge assembly may operate independently of the other blade cartridge assembly. However, the invention is configured such that the blade cartridges may also operate cooperatively. In any embodiment, the foam board cutter may be able to cut a strip of a predetermined width (e.g., a width determined by the distance between the dual blades) from the cutting surface.

According to embodiments, the blade cartridge assemblies may also include a slider button assembly. A slider button assembly may comprise a slider button affixed to a slider post. A portion of the slider, for example, a portion of the slider post and/or the slider button may glide along a channel disposed in the foam board cutter housing.

According to embodiments of the current invention, the foam board cutter may further comprise a first housing shell connected to a second housing shell, for example, by an attachment means. One or more attachment means may be utilized to connect the first housing shell to the second housing shell. The attachment means may be screws, pins, adhesives or any other suitable attachment means from attaching housing shells. In some examples, the first housing shell may be directly or indirectly connected to the second housing shell, for example, the first housing shell may be partially and/or indirectly connected to the second housing shell by means of an intermediate member. In some examples, attachment means corresponding to the attachment means of the housing shells may be disposed on the intermediate member. For example, shaped protrusions extending from an interior face of each of the housing shells may be configured to attach to or otherwise engage with correspondingly shaped cavities disposed on the intermediate member. Additionally or alternatively, shaped protrusions extending from an interior face of a housing shell may be configured to attach to or otherwise engage with correspondingly shaped cavities disposed on the opposing housing shell. In some embodiments, the first housing shell and the second housing shell may be integrally connected. The first blade cartridge assembly may be configured to align against a first housing shell on one side of the intermediate member and a second blade cartridge assembly may be configured to align against a second housing shell on a second side of the intermediate member. In some examples, the first and second cartridge assemblies may each be configured to align against the intermediate member.

According to embodiments of the current invention, a foam board cutter may comprise a dual blade cartridge assembly wherein each blade cartridge assembly may comprise a blade holder and a blade and wherein each blade cartridge assembly operates independently of or cooperatively with the other blade cartridge assembly. In some embodiments, each blade cartridge assembly may be configured within a housing shell comprising a first housing shell and a second housing shell.

According to embodiments of the current invention, a rear end of the foam board cutter may comprise an end cap extending beyond the first housing shell and second housing shell. Furthermore, a rear end of each of the housing shells may comprise one or more protrusions having one or more flat sidewalls against which the end cap may slide in vertical direction to be reversibly removed.

According to embodiments of the current invention, the end cap of the foam board cutter may further comprise one or more blade cartridge locking notches within which the slider button, sider post, and/or any other portion of the blade cartridge assembly may fit into to selectively lock the end cap in a recess covering position.

According to an embodiment of the present invention, the blade cartridge assembly may further comprise a blade holder configured to receive the cutting blade in two orientations (e.g., front-facing and rear-facing orientations).

According to embodiments of the current invention, the blade may be made from any suitable material, including, but not limited to, metal, ceramic, or any combination thereof. In the preferred embodiment, the cutting blade is made from a ceramic material that is capable of withstanding extended use without becoming dull or unusable. Ceramic materials appropriate for such construction include, but are not limited to, zirconium oxide.

It is an object of the present invention to provide a cutter that is able to cut through all grades of paper, cardboard, mat boards, foam boards, fabrics, plastics, sheets of metal, and other materials.

It is another object of the present invention to provide a foam board cutter that is safe.

It is another object of the present invention to provide a foam board cutter that utilizes one or more ceramic blades adapted to last over eleven times longer than traditional cutting blades.

It is another object of the present invention to provide a foam board cutter the is able to cut at an even 45° angle.

It is another object of the present invention to provide a foam board cutter that is able to cut at an even 90° angle.

It is another object of the present invention to provide a foam board cutter that is able to make 45° cuts in two directions.

It is another object of the present invention to provide a foam board cutter that supports blade changing without the use of tools (e.g., provides an easy and convenient means for removing, reorienting, and/or replacing blades).

It is another object of the present invention to provide a foam board cutter that is ergonomically efficient.

It is another object of the present invention to provide a foam board cutter that is able to make dado and channel cuts, as well as gaps, in one or more sheets of material, for example, foam boards or cardboard materials.

It is another object of the present invention to provide a foam board cutter that is able to make partial, parallel cuts, in one or more sheets of material, for example, foam boards or cardboard materials.

It is another object of the present invention to provide a foam board cutter formed with a "nose" or shaped extension defining a lifting tool, for example, at the tip of the front end of the housing, which may be utilized to dig, tool and/or "plow" between two cuts, for example, a pair of parallel cuts, formed by the foam board cutter to form a channel in the foam board, for example, to scrape out foam between the two cuts and/or to create a gap in the foam board between the two cuts.

It is another object of the present invention to provide a foam board cutter which is able to be used to score sheets of material, for example foam board or cardboard material.

It is another object of the present invention to provide a foam board cutter comprising dual blade cartridge assemblies to support use of the device by both right- and left-handed users (e.g., ambidextrous).

It is another object of the present invention to provide a foam board cutter that has a low profile to make it easy to store.

It is another object of the present invention to provide a foam board cutter that is straightforward and easy to use, for example, by professional architects, designers, modelmakers and the like, as well as do-it-yourself (DIY) crafters, students, and others of the general public.

It is another object of the present invention to provide a foam board cutter comprising dual parallel, side-by-side functioning blades.

It is another object of the present invention to provide a foam board cutter that is easy to use with guides, for example, ruler guides.

It is another object of the present invention to provide a foam board cutter that provides multi-step blade retraction to support cuts which may be customized to each user's individual needs.

It is another object of the present invention to provide a foam board cutter that is able to make straight cuts, 45° bevel cuts, and channel cuts and includes a plow feature in one tool without any need to modify the tool componentry, for example, without requiring any ancillary tool components or attachments.

It is another object of the present invention to provide a foam board cutter which is able to make straight cuts of various depths, including straight cuts of 0.1-0.5 inch depths.

It is another object of the present invention to provide a foam board cutter whose blades are able to be reoriented and/or replaced without the use of tools.

It is another object of the present invention to provide a foam board cutter with a 45° cutting setting (e.g., identified by a 45° indicator notch) that supports adequate blade depth for example, for cutting 3⁄16 inch (5 millimeter) cuts in a foam board, for example, to avoid cutting through a backing paper of the foam board. In some scenarios, the blade may be extended further than the 45° indicator groove, for example, to further cut through the foam board (or other material).

It is another object of the present invention to provide a foam board cutter that is relatively light-weight, for example, weighing less than 91 g.

In accordance with embodiments of the present invention, a cutting device may comprise a first blade cartridge assembly configured in parallel position to a second blade cartridge assembly, wherein each blade cartridge assembly comprises a blade holder configured to retain a blade and a slider button assembly configured to move along a slider track, wherein each blade cartridge assembly operates independently of the other blade cartridge assembly. In some embodiments, each blade cartridge assembly may be able to function side-by-side and simultaneously with the other blade cartridge assembly. In some embodiments, each slider button assembly may comprise a slider button having a slider post extending from a bottom surface thereof, the slider post comprising a pair of wing elements extending from opposing side surfaces thereof, and a base plate formed with a shaped opening configured to receive the slider post, a shaped member formed in a wide "u" shape, comprising a pair of arm elements extending from a flexible base portion which may extend from a surface of the base plate, and wherein a portion of the shaped member configured to move relative to the shaped opening. In some examples, the slider post may loosely fit within the shaped opening of the base plate and upon application of a force on the slider button, the wing elements may be adapted to move the arm elements. In some embodiments, the arm elements of the base plate may be configured to selectively engage with notches disposed on the slider channel formed on a housing of the foam board cutter to selectively lock the slider assembly in a user selected position along the slider track.

In accordance with embodiments of the present invention, a cutting device may comprise a housing formed with one or more blade cartridge assembly tracks, each track comprising a slot having an interior top boarder formed with a plurality of notches, a pair of blade cartridge assemblies, each adapted to engage with at least one of the blade cartridge assembly tracks, each blade cartridge assembly further comprising: a slider button assembly comprising a base plate adapted to engage with a slider button formed with a slider post adapted to travel through at least one of said slots of the blade cartridge assembly tracks, the base plate formed with a shaped opening and a shaped member having two engagement ends, each engagement end configured to be selectively received by the notches of the blade cartridge track to selectively lock the slider button assembly in a user-selected position relative to the blade cartridge track; and a blade holder adapted to receive a blade. In some embodiments, each blade cartridge assembly of the pair may be configured in parallel position to the other blade cartridge assembly of the pair and may be able to function side-by-side and simultaneously with the other blade cartridge assembly of the pair. In some embodiments, at least a portion of the slider post and at least a portion of the shaped member may be configured to be received within the shaped opening of the base plate. In some example, the foam board cutter may further comprise a first housing shell connected to a second housing shell and an intermediate body member configured to align the first blade cartridge on one side of said body member and a second blade cartridge on a second side of said body member. In some examples, a rear end of said intermediate member may extend beyond said first housing shell and second housing shell and may comprise one or more elongated protrusions which an end cap may be configured to slide in vertical direction along to be reversibly removed to enable removal of each of the blade cartridge assemblies from one or more recesses formed between each of the housing shells and the intermediate member. In some embodiments, a top edge of the intermediate member may be formed with a notch adapted to receive a locking switch of the end cap to lock the end cap in a secured position on the rear of the intermediate member. In some examples, each blade cartridge may be positioned on a side of the intermediate member, and the intermediate member may comprise a pair of grooves on each such side, upon which each blade cartridge is able to move to stably extend or retract either of said blades from the housing.

In accordance with embodiments of the present invention, a foam board cutter may comprise a body member comprising: a pair of housing shells, each housing shell comprising a slider button track formed with a slot having an interior boarder at least partially formed with a plurality of notches; and an intermediate member disposed between and configured to support connection of the pair of housing shells, the intermediate member comprising at least a pair of interior faces, each interior face of the pair comprising a blade cartridge assembly groove; a pair of blade cartridge assemblies, each configured to be disposed between a housing shell of the pair and the intermediate member, and further comprising: a slider button assembly comprising a base plate adapted to engage a slider post of a slide button adapted to travel along the slot of the slider button track, the base plate formed with a shaped member having at least two notch engagement ends, each notch engagement end of each slider button assembly configured to be selectively received by the notches of its respective slider button track to selectively lock each slider button assembly in a selected position relative to its respective slider button track; and a blade holder extending from an end of the slider button assembly and configured to retain a blade. In some embodiments, each of the blade cartridge assemblies may be configured to travel between the intermediate member and a housing shell of the pair, with a first blade cartridge assembly of the pair configured to travel along a first blade cartridge assembly groove of the intermediate member simultaneously as the first blade cartridge assembly travels along a first slider button track of the pair, and a second blade cartridge assembly of the pair configured to travel along a second blade cartridge assembly groove of the intermediate member simultaneously as the second blade cartridge assembly travels along a second slider button track of the pair. In some examples, a gap may exist between the intermediate member and each of the housing shells to define at least two recesses in the rear portion of the body member through which the blade cartridge assemblies may travel to be removed from within the body member. In some embodiments, a rear of said body member may be configured with a removable end cap configured to selectively cover at least said recesses. In some embodiments, the blade holder may comprise a pair of arm extensions, a first arm extension comprising one or more "u" shaped protrusions and a second arm extension comprising a cylindrical protrusion configured to be received in a receiving hole formed in the blade. In some examples, the cutter may further comprise a lifting tool formed on a front end of the intermediate member configured to support a plowing feature of the foam board cutter. In some embodiments, each slider button assembly may further comprise: a pair of wing elements extending from opposing side surfaces of the slider post; and a shaped opening formed in the base plate; wherein the shaped member is formed in a wide "u" shape and comprises a pair of arm elements extending from a flexible base portion which extends from a surface of the base plate, each arm element comprising at least one notch engagement end, and wherein at least a portion of the shaped member configured to be received by the shaped opening. In some examples, the slider post may loosely fit within the shaped opening of the base plate and upon application of a force on the slider button, the wing elements may be adapted to move the arm elements and disengage the arm elements from the notches of the slider track to selectively permit movement of the blade cartridge assemblies.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

Figure 1:
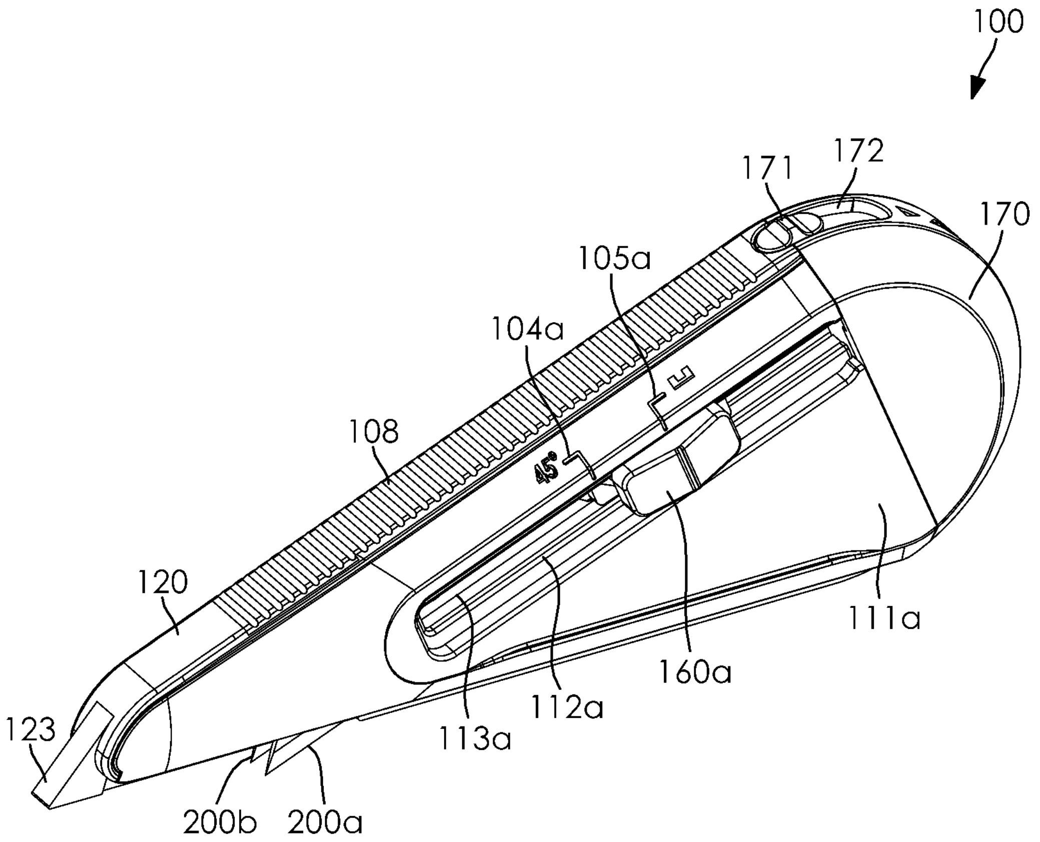
FIG. 1 is a perspective view of a foam board cutter in accordance with a first embodiment of the present invention.

The present invention generally relates to a dual action foam board cutter. Specifically, embodiments of the present invention relate to a cutting apparatus configured with two blades that can separately or concurrently act upon a cutting surface. Both blades may be straight to yield a strip of a predetermined width.

According to an embodiment of the present invention, the foam board cutter as described herein may comprise a pair of housing shells forming at least a part of a housing, at least two blade cartridge assemblies, and at least two cutting blades. Certain embodiments of the present invention may include fewer components or additional components depending on the particular use requirements of the foam board cutter. One of ordinary skill in the art would appreciate that there are many optional components and configurations for a foam board cutter, and embodiments of present invention are contemplated for use with any such component or configuration.

According to an embodiment of the present invention, the foam board cutter may be constructed from any suitable variety of durable materials. In a preferred embodiment, the majority of the components of the foam board cutter are primarily formed from plastic or a plastic composite material. In some embodiments, the components of the foam board cutter may be formed from a metal or metal alloy. In some embodiments, the foam board cutter may be constructed from a variety of materials, for example, with i) each side shell collectively forming the housing shells, intermediate member, slider button assembly, and blade cartridge assembly being constructed of a plastic material; and ii) the cutting blade from ceramic material. In some embodiments, certain components of the foam board cutter may be formed from a specific material based upon the application or function of a given component. As an illustrative example, certain portions of the housing shells may be made from a polyamide plastic that is more resistant to wear. One of ordinary skill the art would appreciate that there are numerous suitable materials from which the components of the foam board cutter could be constructed, and embodiments of the present invention are contemplated for use with any such material.

According to an embodiment of the present invention, the housing shell may be bifurcated into two halves (e.g., first and second housing shells). In some embodiments, a housing may comprise a first housing shell and a second housing shell that assemble together to define an interior cavity configured to receive and retain the blade cartridge assemblies. In some embodiments, a housing may further comprise at least one engagement or attachment means configured to bind the first housing shell and second housing shell together in alignment. In some embodiments, the engagement means are configured to integrate within one another such that a component of a first housing shell is inserted and fitted into a corresponding receiving component on a second housing shell. As an example, the inner surface of a first housing shell may be constructed with multiple protrusions that fit into and unite with corresponding receiving holes or cavities positioned on the second housing shell. Once the protrusions of the first housing shell are securely interlocked within hollowed cavities on the second housing shell, the foam board cutter may be securely assembled. In some embodiments, the engagement means are configured to integrate within one another such that a component of a first housing shell is inserted and fitted into a corresponding receiving component on a second housing shell. Once the engagement protrusions are securely interlocked within hollowed cavities, the foam board cutter may be securely assembled. One of ordinary skill in the art would appreciate that the housing shells could be designed in any number of configurations and configured with any number and type of engagement means, and embodiments of the present invention are contemplated for use with any such configuration and engagement means.

According to embodiments of the present invention, an intermediate member may be used to support connection of the first and second housing shell and/or to provide a slider track upon which either or both of the blade cartridge assemblies may travel. In some examples, an intermediate member may be configured as an edge of a middle section of the housing, for example, between the first and second housing shells. The intermediate member may comprise a generally triangular body having a tip at a front portion thereof, and a textured area on a top portion thereof. A rear end of the intermediate member may comprise an end cap engagement portion which may comprise an end cap track formed as a substantially elongate protrusion along which a recessed portion of an end cap may be configured to travel. The intermediate member may further comprise at least two sides, for example, at least a first and a second side, disposed between a top portion and a bottom portion of the intermediate member. The first and second sides of the intermediate member may be formed with a blade cartridge track formed as a substantially linear, shaped groove in the first and second sides of the intermediate member. In some examples, at least a portion of a shaped groove, for example, a front portion of the shaped groove may correspond in shape and size to a second arm extension of a blade holder, for example, to enable the shaped groove to receive at least a portion of the second arm extension of the blade holder. In some examples, the shaped groove(s) of the intermediate member may terminate at a rear portion of the intermediate member, for example, such that one or both of the blade carriage assemblies may be removed through a cavity formed between each of the housing shells and the intermediate member. In some examples, the tip of the intermediate member may comprise a lifting tool formed as a “nose” or shaped extension at the tip of front portion of the housing (e.g., the intermediate member) which may be utilized to lift a strip of a cutting surface, for example, a foam board or cardboard cutting surface. The dimensions of lifting tool tip may vary depending on the intended use of the foam board cutter. In some examples, the lifting tool may be integrated with (e.g., formed with) a portion of the housing, for example, the intermediate member. However, in some embodiments, the lifting tool may be an independent component which may be configured to engage with a portion of the housing, for example, the intermediate member of the housing, through the use of releasable or permanent engagement means. The engagement means may be interlocking dovetail components, for example, dovetail components configured on the lifting tool and corresponding dovetail components configured on a portion of the housing. In some embodiments, the engagement means may be pins, screws, glues, adhesives, or any other similarly suitable engagement means configured to permit reliable or permanent attachment of the lifting tool to a portion of the housing, depending on the intended use for the foam board cutter. In some examples, one or more different lifting tool profiles may be provided and/or utilized to support customization of the strip of cutting surface desired to be cut, for example, depending on the dimension, style, shape, or size of strip of surface material desired to be cut. In some examples, the intermediate member may comprise at least one engagement means configured to bind each of the first housing shell and second housing shell to an intermediate member in alignment by means of protrusions extending from the first and second housing shell inner surfaces and configured to fit into and unite with corresponding receiving holes or cavities in the intermediate housing member. As a further example, an interior surface of each of the first and second housing shells may be constructed with receiving holes configured to receive and unite with corresponding protrusions extending from one or more surfaces of the intermediate member. In some examples, the intermediate member may comprise relatively large shaped hollow recesses through which one or more housing shell engagement means may pass through, for example, to enable a first housing shell and a second housing shell to directly connect with one another, while also connecting the housing shells to the intermediate member. Additionally or alternatively, the first and second housing shells may connect to the intermediate member via one or more engagement means to form the housing. In some examples, the hollow recesses of the intermediate member may be trapezoidal, triangular, square, rectangular or any other similarly suitable shape. Once the engagement protrusions of any of the first housing shell, second housing shell, or intermediate member are securely interlocked within corresponding hollowed cavities of any of the first housing shell, second housing shell, or intermediate member (as applicable), the foam board cutter may be securely assembled. One of ordinary skill in the art would appreciate that an intermediate member could be adapted with a number of designs, and embodiments of the present invention are contemplated for use with any suitable design.

According to an embodiment of the present invention, each of the first and second housing shells of the foam board cutter may comprise a slider channel (which may also be referred to herein as a slider track and/or a blade cartridge track or channel) that may guide the movement of the slider button of the slider button assembly. Within a slider channel may include a hollow carved out slot or recessed channel that may create a movement boundary for the slider button and/or the slider button assembly. In some embodiments, the slider slot or recessed channel may be open ended on one end, for example, at a rear end of the slider channel, for example, to enable removal of a slider button assembly from a rear end of the housing. In some examples, the slider button may extend exteriorly out of the housing shell from an internally situated slider button assembly. As the slider button moves laterally across the slider channel, the blade, being in operable communication with the slider button assembly, may also laterally move translating to the retraction and extension of the blades. On the interior face of a housing shell, the slider channel may be configured with a movement guide that enables controlled movement of the slider button. In some embodiments, the movement guide may be constructed as a row of notches fashioned on a top surface of the slider channel that may span the length of the slider channel (although in some embodiments, the row of notches may be shorter or longer than the length of the slider channel), while the bottom surface may be smooth and flat to facilitate gliding of the slider button through or along the channel. In some embodiments, the movement guide may be constructed as a row of notches fashioned on a bottom surface of the slider channel that may span the length of the slider channel (although in some embodiments, the row of notches may be shorter or longer than the length of the slider channel), while the top surface may be smooth and flat to facilitate gliding of the slide button through or along the channel. In some embodiments, both the top and bottom surfaces of the movement guide may be configured with a row of notches. In some examples, the top and bottom surfaces of the slider channel may be smooth and flat. One of ordinary skill in the art would appreciate that the housing shells could be designed in any number of configurations and configured with any number and type of slider channels or slider slots without departing from the spirit and scope of the present application, and embodiments of the present invention are contemplated for use with any such configuration and slider channels and slider slots.

According to embodiments of the present invention, the housing may generally mimic the external configuration of the foam board cutter. In some embodiments, the housing (e.g., each of the housing shells) and/or the intermediate member may be generally triangular. Each housing shell may be adapted to engage with a blade cartridge assembly comprising a blade holder and a slider button assembly. In some embodiments, each housing shell of the housing may be identical to the other housing shell of the housing enabling individual or dual blade operation. The rear end of the housing (e.g., the first and second housing shells) may be configured to engage with an end cap at least at a juncture between the first housing shell and second housing shell.

According to embodiments of the present invention, dual blade cartridge assemblies may be disposed in the housing. In some embodiments, one end, for example, a front end, of each blade cartridge assembly may comprise a blade holder while an opposite end, for example, a rear end, of each blade cartridge assembly may comprise a slider button assembly. The blade holder and slider button may be integrally formed together (e.g., may be a unitary component) or may be configured to engage and connect with one another via one or more engagement means, for example, screws, pins, adhesives, or any other engagement means known by one of ordinary skill to be suitable for attaching the slider button assembly and the blade holder.

According to embodiments of the present invention, a blade holder may be comprised of two arm extensions, namely, a first arm extension formed to substantially abut a first side of a blade, for example, a first flat side disposed between the "spine" and "belly" sides of a blade, and a second arm extension formed to substantially abut a second flat side of a blade, for example, a second side disposed between the "spine" and "belly" sides of a blade. The arm extensions may comprise substantially flat side or exterior faces to facilitate gliding across blade cartridge tracks configured on one or both of the housing shells and/or the intermediate member. The opposing first and second arm extensions may function to hold the blade. In some embodiments, the blade in the blade holder may be supported by either or both of the arm extensions. In an illustrative example, a first arm extension may be configured as an elongated member adapted to extend along or near a top edge (or "spine" side) of a blade, and may optionally be configured along or near additional edges or sides of a blade, for example, along or near a rear side of a blade. A first arm extension may further comprise one or more shaped protrusions, for example, four “u” shaped protrusions, adapted to engaged with one or more notches, for example, four “u” shaped notches, disposed on a top side of a blade to support holding and/or retaining a blade. In some examples, a second arm extension may be configured as an elongated member adapted to extend along or near a middle section of a flat side of a blade. A second arm extension may further comprise one or more protrusions, for example, one substantially cylindrical protrusion, adapted to be received in a receiving hole or cavity, for example, at a general center of a blade, to support holding and/or retaining a blade. Either or both of the arm extensions may be substantially flexible or substantially rigid (depending on the intended application for the blade holder). For example, either or both of the arm extensions may be configured to be flexible enough to bend at least to an extent necessary to release a blade from either or both of the arm extensions, for example, by bending at least one of the arm extensions, for example, a second arm extension, to remove the shaped protrusion from the receiving hole formed in the blade, and permit the release of the blade notches from within the shaped protrusions of the first arm extension. The resulting configuration may be a blade that may be positioned and releasably held in place by the blade holder and whose position is reinforced by the arm extensions. In some examples, the arm extensions may be pivotally connected to one another, for example, by means of a hinge, joint, or other pivoting mechanism and may be configured to pivot open (e.g., move a first arm extension from a first, closed, position to a second, opened position) to enable engagement of a blade with a second arm extension (e.g., a shaped protrusion of a second arm extension may be inserted through an opening in the blade to retain the blade), subsequently, the first arm extension may pivot to close and engage any shaped protrusions on the first arm extension with any notches formed on a “spine” side of the blade. In some embodiments, a single arm extension may be capable of performing the corresponding functions of the blade holder, for example, a single arm extension may be formed with one or more “u” shaped protrusions and, for example, one or more cylindrical protrusions to support connection to notches and/or receiving hole(s) formed in a blade. One of ordinary skill in the art would appreciate that the blade holder could be adapted with a number of designs, and embodiments of the present invention are contemplated for use with any suitable design.

According to embodiments of the present invention, a slider button assembly may comprise a base plate formed with at least one shaped opening, one or more shaped members, one or more slider posts adapted to engage with the slider channel, and a slider button. The base plate may be substantially flat and may be configured with an attachment element that enables the slider button to fasten onto the flat base plate. In some embodiments, the attachment element may be an arrangement of one or more openings that are formed in the base plate. In any example, protrusions may be configured to integrate with corresponding attachment elements (e.g., openings or receiving holes) on the slider button or base plate, as applicable. In some examples, disposed near the opening(s) of the base plate may be one or more engagement grooves. In some examples, extending from a bottom side of the slider button may be a slider post (e.g., a trapezoidal, or any other similarly suitable shaped post element) configured to engage and fit within an opening or receiving hole formed in the base plate being correspondingly shaped (e.g., a square, oval, trapezoidal, or any other similarly suitably shaped receiving hole, including non-standard geometric shaped openings). In some examples, the slider post may further comprise one or more post elements, for example, a pair of post elements, configured as slight protrusions extending from top and bottom surfaces of the slider post. The post elements and may be configured to support selective attachment of the slider button to the base plate of the slider button assembly, for example, may be configured to engage with the engagement groove(s) disposed near the opening(s) of the base plate. In some examples, a base portion of a shaped member, which may be configured of a generally flexible material, may extend from the base plate, for example, from a position under the shaped opening(s). The shaped member of the base plate may be configured to bias the slider post outwards of opening(s) formed in the base plate, however, the post elements of the slider post may prevent the slider post from dislodging or moving completely out of the opening. In some examples, the post elements may prevent the slider post from moving in one direction, while permitting movement in the other direction (e.g., against the biasing force of the shaped protrusion). In some examples, when the slider assembly is at rest (e.g., not in use), the post elements may be configured to abut the engagement grooves disposed near the base plate opening. In some examples, extending from the slider post may be one or more wing elements, for example, a pair of wing elements. In an illustrative example, a pair of wing elements may extend from a top surface of the slider post and may be configured to be disposed in close proximity to the arm elements of the shaped member in an assembled slider assembly. In an exemplary usage scenario, upon engagement of the slide button (e.g., upon application of a downward or sideways force on the slider button), the wing elements of the slider post may be configured to substantially abut, push against and/or displace at least one of the arm elements out of a notch which such arm element(s) may be disposed.

In some examples, the base plate of the slider button assembly may comprise a shaped member (for example, a generally “u” shaped member) and an opening (e.g., a receiving hole) adapted to receive a portion of the slider button shaped member and/or a portion of the base plate shaped member. In some examples, a portion of the base plate of the shaped member, for example, a bottom portion of the shaped member, may extend from a surface of the base plate. In an illustrative example, a shaped member extending from a surface of the base plate may be formed in a generally wide “U” shape, such that the shaped member includes a base portion, with two arm elements extending therefrom. In some examples, the base portion of the shaped member extends from a surface of the base plate, and is formed of a material of predetermined flexibility (e.g., Polyoxymethylene (POM)) configured to permit movement of at least a portion of the shaped member relative to the base plate. For example, a flexible base portion of the shaped member may permit the shaped member to move towards (e.g., into) and away from (e.g., out of) an opening formed in the base plate of the slider button assembly. In some examples, a portion of the shaped member, for example, the arm elements of the shaped member may be biased outwards of an opening in the base plate, and may be optionally directed towards the opening in the base plate by means of user force (e.g., a pressing or pushing force). In some examples, a tension component, for example, a spring, leaf spring, coil or any other similarly suitable tension component, may be utilized to similarly bias at least a portion of the shaped member outwards of the opening, and which may be pressed or compressed to move the shaped member towards or into (as appropriate) an opening formed in the base plate. In an exemplary usage scenario, a portion of the shaped member(s), for example, at least a portion of the arm elements of the shaped member(s) may be adapted to engage with the slider channel, for example, to engage with the notches disposed along the slider channel.

In some embodiments, a top surface of the slider button may comprise one or more protrusions, ridges, and/or a textured area configured to support user grip of the slider button.

In some examples, the slider button may be configured as a push button, which may be configured to permit movement of the slider button (and, for example, a blade/blade holder operably connected thereto) when the slider button is pressed and the arm elements of the shaped member are disengaged (e.g., removed) from the notches of the slider channel formed on the housing shells. For example, a pair of arm elements may be configured to simultaneously engage with a pair of notches of the slider channel to lock the slider assembly in a selected user position. Moreover, a pair of arm elements may be configured to simultaneously disengage with a pair of notches of the slider channel to unlock the slider assembly from a given position, and permit movement of the slider assembly and, for example, a blade operably connected thereto. One of ordinary skill in the art would appreciate that the slider button assembly could be adapted with a number of designs, and embodiments of the present invention are contemplated for use with any suitable design.

According to embodiments of the present invention, an end cap of a foam board cutter may comprise housing engagement means, a locking switch assembly, and a blade cartridge locking notch. In some embodiments, the housing engagement means of the end cap may be one or more recesses formed on a surface of the end cap and adapted to slidably engage with one or more elongated protrusions formed on at least a portion of the housing, for example, on one or more of the housing shells or the intermediate member. In some examples, the elongated protrusion(s) of the housing may define a track upon which the end cap may travel. In some examples, a switch of the locking switch assembly may be disposed along an edge of the end cap. In some embodiments, the switch may be configured to lock the end cap in a position relative to the housing of the foam board cutter.

In accordance with embodiments of the present invention, the locking switch assembly of the end cap may comprise a switch track and a locking switch which may be configured to slide between a first and a second position. In some embodiments, a first switch position may correspond to a position in which the locking switch engages with a corresponding notch formed in a top and/or rear portion of the intermediate member and the second position may be the position in which the switch is removed from such a notch in the intermediate member, for example, by moving the switch along the switch track, to permit removal of the end cap from alongside the housing. Consequently, the end cap may be configured to be locked in a "recess covering" position when the switch is in the first position and the end cap is engaged with, for example, received within the notch, formed in a top/rear end of the housing. Moreover, the end cap may be moved to an unlocked, "recess uncovering" position when the switch is in moved to the second position, and the end cap is disengaged from, for example, removed from the notch formed in, a top/rear end of the housing. In an exemplary usage scenario, one or both of the blade cartridges may be removed, for example, for replacement or reorientation of the blades, by moving the locking switch to an unlocked position, moving the end cap (e.g., gliding the end cap along the elongated protrusion of the rear portion of the housing formed as a track) so that the end cap uncovers at least a portion of the recess(es) formed on the rear end of the housing, for example, between the intermediate member and each respective housing shell to permit removal of the blade cartridge(s). In an illustrative example, the blade cartridge(s) may be removed from within the housing by moving the blade cartridge(s) towards the rear end of the housing shells, for example, by means of the slider button(s), and ejecting the blade cartridge(s) from or through the recesses of the housing. In some scenarios, the end cap remains engaged with (e.g., captured by) the housing in the "recess uncovering" position, for example, to prevent loose parts. For example, a protrusion extending from the housing may be configured as a "one way snap fit" which prevents the end cap from fully disengaging from the housing, to "capture" the end cap and prevent loose parts. One of ordinary skill in the art would appreciate that the end cap could be adapted with a number of designs, and embodiments of the present invention are contemplated for use with any suitable design.

With respect to the figures, for ease of discussion, some dual components (e.g., components which are present in corresponding pairs in the foam board cutter of the present disclosure) may be referenced using the same or similar reference number, in combination with either an "a" or a "b", indicating that referenced component may be found either on a first side (e.g., side "a") or on a second side (e.g., side "b") of the foam board cutter. Though in this written description, the reference numbering may not indicate whether a given component is on a first side (e.g., side "a") or on a second side (e.g., side "b"), the drawings may provide such indication. Though any given component may be identified as being disposed on one side, one of ordinary skill in the art may understand that some elements indicated as being relative to a first side, may also be relative to a second side and vice versa. For elements which a side is not indicated, one of ordinary skill in the art may understand that such elements may be applicable to either or both of the sides of the device.

Turning now to the figures, FIGS. 1-12 illustrate a lifting tool in accordance with embodiments of the present invention which may be configured to aid in lifting a strip of a cutting surface, for example, when both blades of the foam board cutter are simultaneously used.

Figure 2:
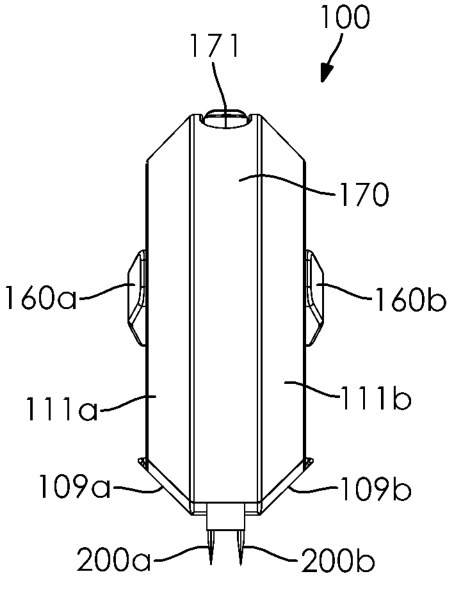
FIG. 2 is a rear view of a foam board cutter in accordance with a first embodiment of the present invention.

FIG. 1-2 depict perspective and rear views, respectively, of an exemplary foam board cutter having dual blade cartridge assemblies in accordance with an embodiment of the present invention. As shown in FIGS. 1-2, the foam board cutter 100 may comprise a housing 110 comprising a first housing shell **111*a* and a second housing shell 111*b* which may correspond in shape to one another (e.g., may be mirror images of one another) and may fit together, either directly or through an intermediate member 120. The second housing shell 111*b* may oppose and substantially correspond to the first housing shell 111*a*. The first and second housing shells 111*a* and 111*b* may partially or fully encase one or more components of foam board cutter 100, including at least a portion of the intermediate member 120, and at least a portion of one or more cutting blades, for example, a pair of cutting blades 200*a* and 200*b*. In some examples, each of a first housing shell 111*a* and a second housing shell 111*b* may comprise a slider channel 112 configured with a slot or recessed channel 113 upon which the slider button 161 may glide to optionally extend or retract one or both blades 200*a* and/or 200*b*. In some examples, the slider channel(s) 112** and/or slider slot(s) 113 may be configured as a movement boundary for the slider button 161. For example, a slider slot 113 may be configured as a movement boundary for the slider post 162 of the slider button 161. In some examples, each slider button 161 may be operably connected to a blade 200, for example, by means of a slider assembly 160 and/or a blade cartridge assembly 150.

As further shown in FIG. 1, an exterior surface of the intermediate member 120 may comprise a textured portion 108, for example, to aide in user comfort or gripping during use of the foam board cutter 100. As shown in the depicted embodiment, in some examples, the textured portion 108 may comprise ridges, grooves, indents, or other similar textured features capable of aiding in user comfort or gripping during use of the foam board cutter 100.

Figure 4:
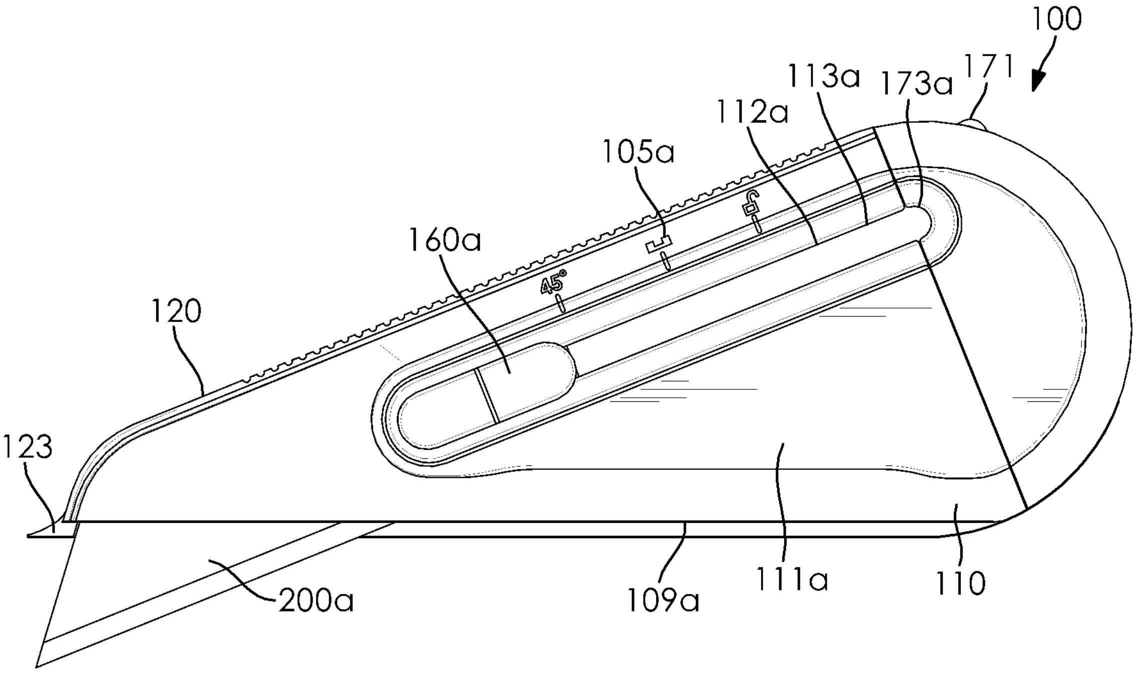
FIG. 4 is a side view of a foam board cutter with the cutting blade in a second exemplary extended position in accordance with a second embodiment of the present invention.

As further shown in FIG. 1, a foam board cutter 100 in accordance with an embodiment of the present invention may comprise a lifting tool 123. In some examples, the lifting tool 123 may comprise a "nose" or shaped extension at the tip of front end of the housing which may be utilized to lift a strip of a cutting surface, for example, a foam board surface. In the depicted example, the lifting tool 123 comprises an angled top face meeting an angled bottom face to form a generally triangular structure. In some embodiments, the top and bottom faces forming the tip of the lifting tool 123 may meet at an acute angle to create a relatively pointed or sharp tip. As shown in FIG. 4, a top face of the lifting tool 123 may be curved, for example, to support lifting a strip of a cutting surface. The dimensions of lifting tool, its top and bottom faces, shape and/or its tip may be adjusted depending on the intended use of the foam board cutter 100. In some examples, the lifting tool 123 may be integrated with (e.g., formed with) a portion of the housing 110, for example, the intermediate member 120. However, in some embodiments, the lifting tool 123 may be an independent component which may be configured to engage with a portion of the housing 110, for example, the intermediate member 120, through the use of releasable or permanent engagement means. The engagement means may be interlocking dovetail components, for example, dovetail components configured on the lifting tool 123 and corresponding dovetail components configured on a portion of the housing 110. In some embodiments, the engagement means may be pins, screws, glues, adhesives, or any other similarly suitable engagement means configured to permit reliable or permanent attachment of the lifting tool 123 to a portion of the housing 110, depending on the intended use for the foam board cutter 100. In some examples, one or more different lifting tool profiles may be provided and/or utilized to support customization of the strip of cutting surface desired to be cut, for example, depending on the dimension, style, shape, or size of strip of surface material desired to be cut.

FIG. 2 depicts a rear view of an exemplary foam board cutters in accordance with an embodiment of the present invention. As shown in the depicted example, the foam board cutter 100 may comprise an end cap 170 which may comprise a housing engagement means, and a locking switch assembly. Moreover, the housing 110 of the foam board cutter 100 may comprise one or more angled sidewalls, for example, sidewalls 109*a* and 109*b*. As further shown in FIG. 2, blade(s) 200*a* and/or 200*b* may be configured to extend from a front, bottom portion of the foam board cutter 100.

Figure 3:
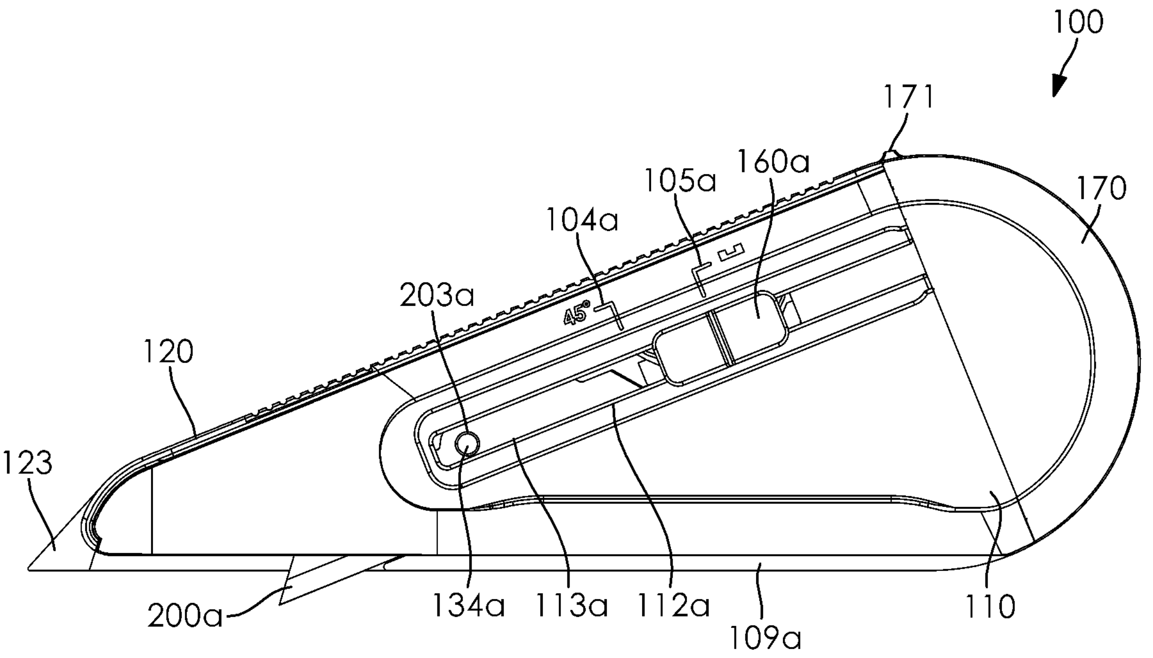
FIG. 3 is a side view of a foam board cutter with the cutting blade in a first exemplary extended position in accordance with a first embodiment of the present invention.

FIGS. 3 and 4 illustrate side views of two exemplary foam board cutter embodiments. As generally shown in FIGS. 3 and 4, a foam board cutter 100 may comprise a housing 110 comprising a first housing shell 111*a* and a second housing shell 111*b* (shown in FIGS. 5-7), with an intermediate member 120 disposed between the first and second housing shells 111*a* and 111*b* (shown in FIGS. 5-7), respectively, and optionally forming at least a part of the housing 100. As shown in the depicted examples, in some embodiments, the housing 110 (including the first housing member 111*a* and the second housing member 111*b*, and optionally, the body member 120) may be formed in an ergonomic triangular shape to support user comfort, however, in any embodiment, the housing 110 may be formed in any similarly suitable ergonomic shape to support user comfort.

As further shown in FIGS. 3 and 4, indicator grooves may be formed along the slider channel of the housing 110. The indicator grooves may indicate slider switch positions having certain functions, for example, positions corresponding to desired blade positions. In some examples, the indicator grooves may include indicator positions corresponding to various depth cuts for standard thicknesses, for example, 3 mm, 5 mm, and 13 mm. In any embodiment, the indicator grooves may indicate any other appropriate depth cuts, including any depth from 0.1 mm to 15.0 mm. In some examples, the indicator grooves may additionally or alternatively include indicator positions corresponding to a 45° cut indicator position 104, and a "channel cut" indicator position 105. In some examples, aligning a groove (or other appropriate alignment indicator, for example, a protruding arrow formed on the slider button) with an indicator groove may position the blade holder 130 a blade 200 operably connected to the slider button 161 in a corresponding blade position indicated by the indicator grooves. A "channel cut" indicator position may be a position in which, when both are the blades 200*a* and 200*b* are set to the "channel cut" indicator position, for example, a position wherein the slider buttons 161*a* and 161*b* are aligned with the "channel cut" indicator position 104, the blades 200*a* and 200*b* may be used in unison to create a channel cut, in a selected cutting material, for example, foam board or cardboard cutting material. A 45° cut indicator position may be a position in which one of the slider buttons 161*a* or 161*b* are aligned with the 45° indicator position 105, and the corresponding blade 200 of such slider button may be used to create a cut of a predetermine depth, for example, a 0.5 inch deep cut.

As shown in FIG. 4, in some examples, the end cap 170 may be formed with first and second faces, which may each be formed with a blade cartridge locking notch 173 (for example, a first face of the end cap may comprise a first notch 173*a* and a second face of the end cap may comprise a second notch 173*b*), configured to correspond in position to and may be continuous with the slots 113*a* and 113*b* formed on the first and second housing shells 111*a* and 111*b*. In some examples, the notches 173*a* and 173*b*, respectively, may each optionally include a slot and may be configured to receive a portion of a slider assembly 160. By means of example, a notch 173 formed in the end cap 170, may be configured to receive a slider post 162 of the slider button 161 and/or a top portion of the slider button 161. In some scenarios, when the slider assembly 160 and/or slider switch 161 are positioned in the notch(es) 173*a* and/or 173*b* formed in the end cap 170, the slider assemblies and/or slider buttons 161 may substantially prevent the end cap 170 from translating with respect to the housing shells 111 (e.g., may prevent the end cap 170 from moving to uncover the recess(es) formed between the housing shells 111 and the intermediate member 120), for example, even if the locking switch 171 is in the unlocked position.

Figure 5:
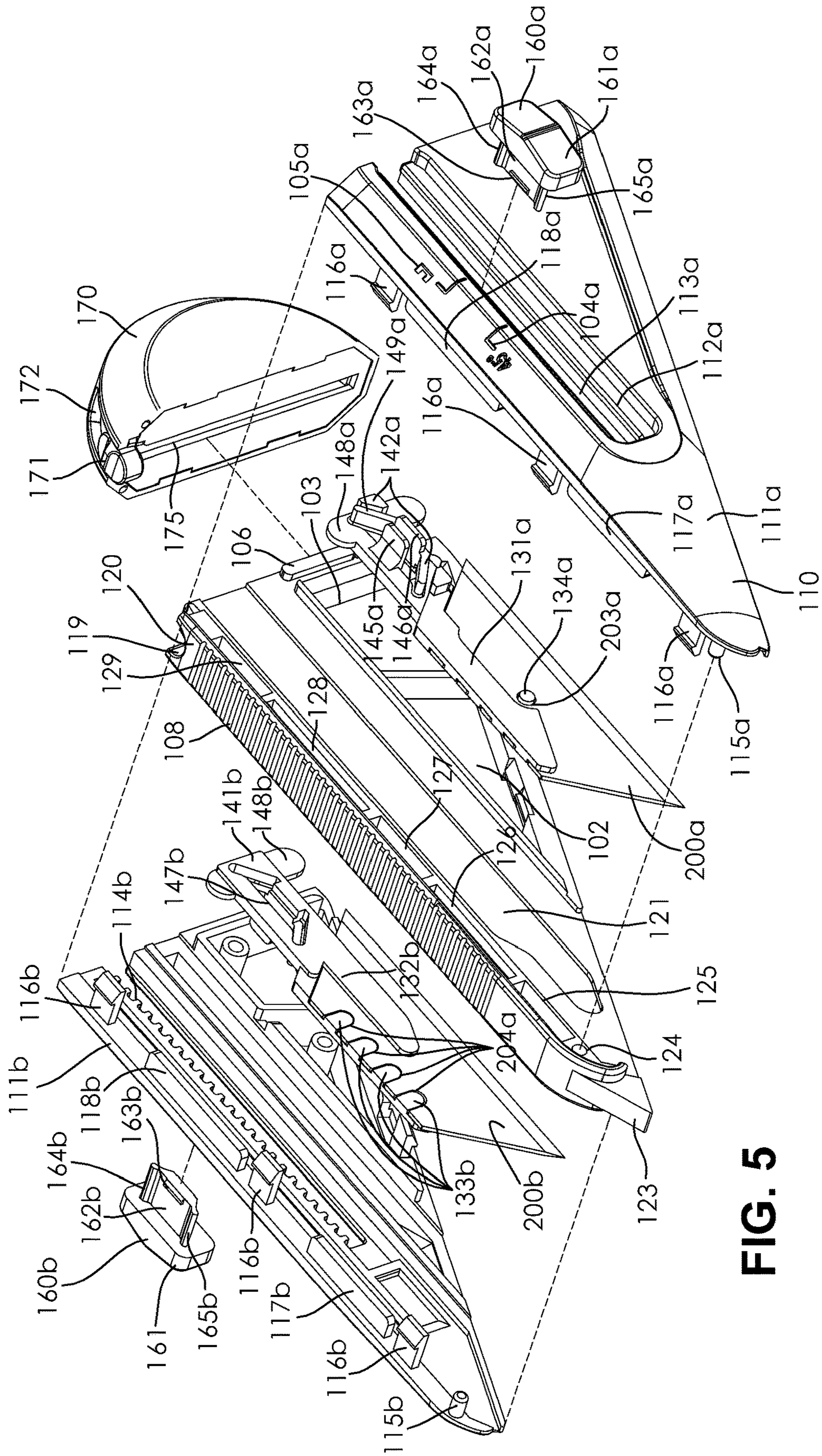
FIG. 5 is a first side, front, top perspective exploded view of a foam board cutter with the cutting blade in retracted position in accordance with a first embodiment of the present invention.
Figure 6:
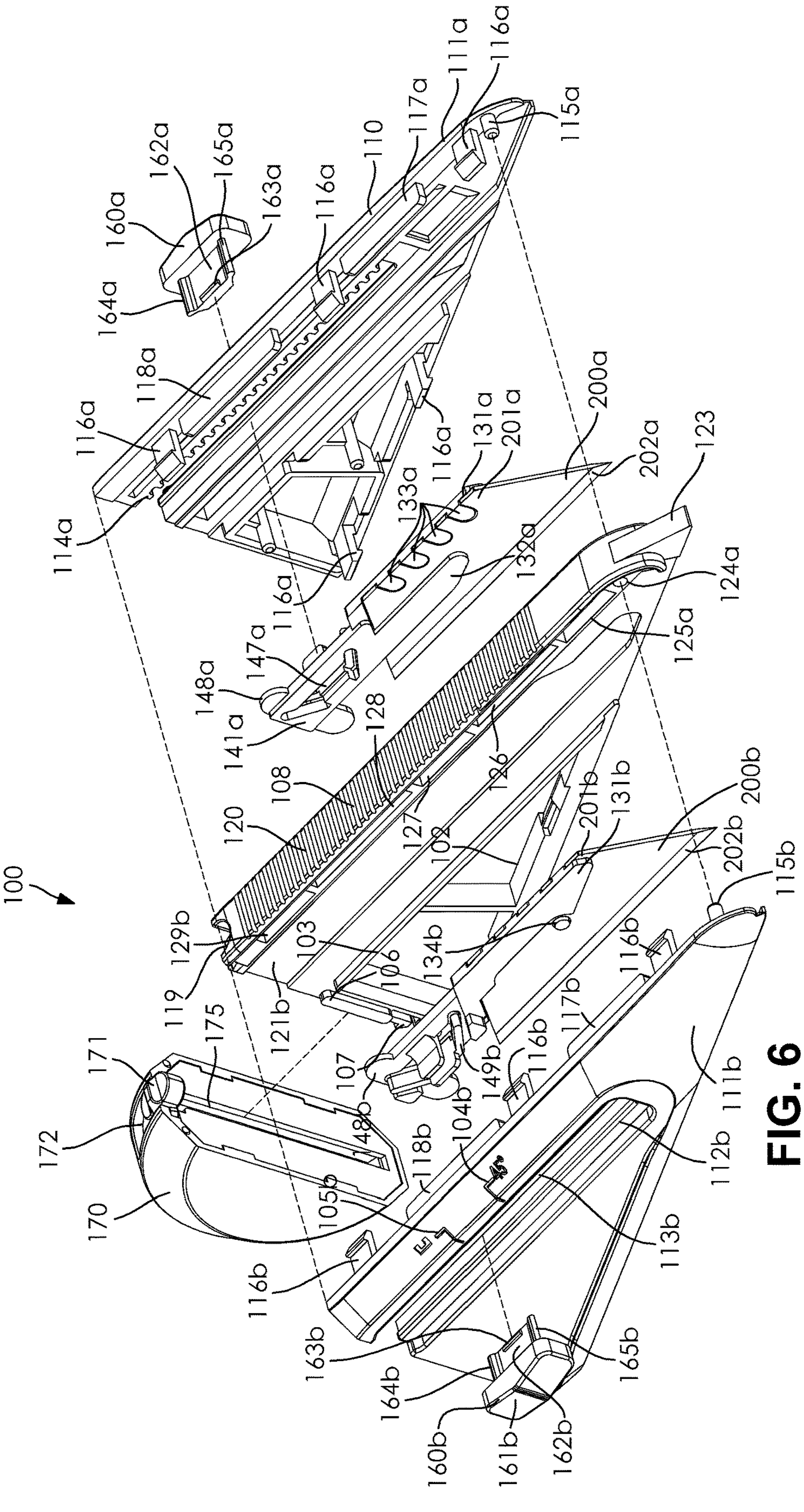
FIG. 6 is a second side, front, top perspective exploded view of a foam board cutter with the cutting blade in retracted position in accordance with a first embodiment of the present invention.
Figure 7:
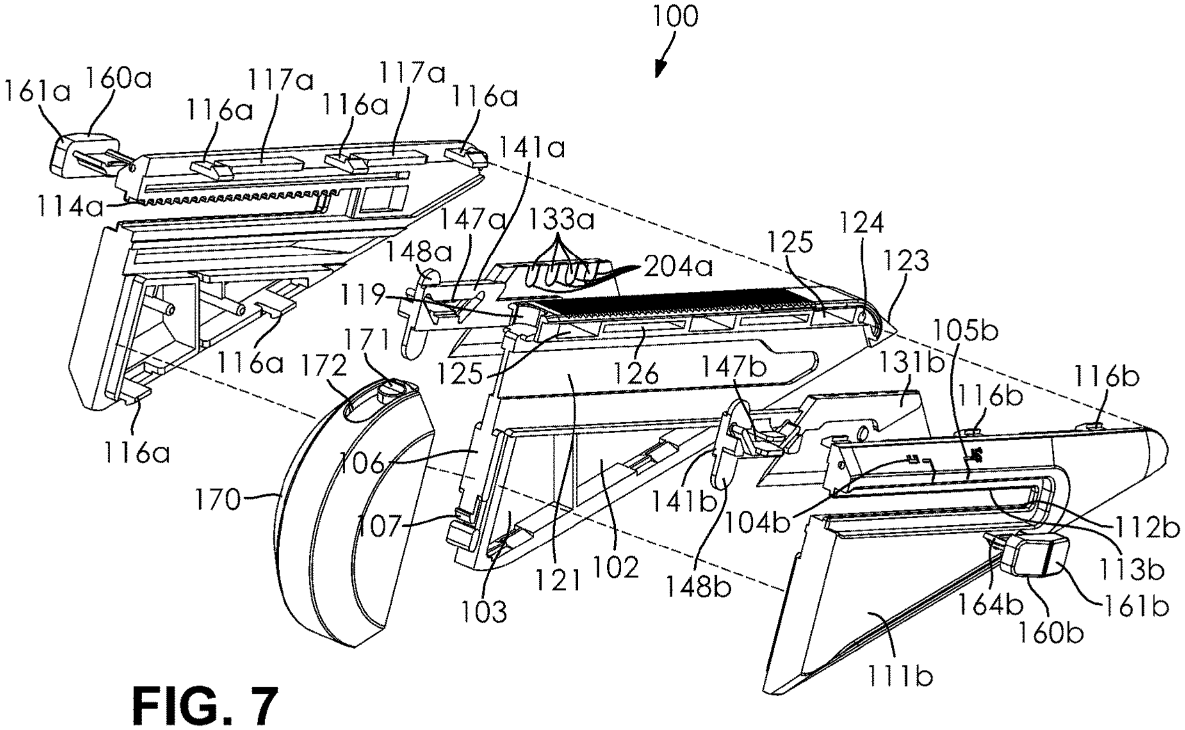
FIG. 7 is a second side, rear, top perspective exploded view of a foam board cutter with the cutting blade in retracted position in accordance with a first embodiment of the present invention.

FIGS. 5-7 depict various perspective exploded views of an exemplary foam board cutter in accordance with an exemplary embodiment of the present invention. As shown in FIGS. 5-7, a foam board cutter 100 may comprise a first housing shell 111*a* and a second housing shell 111*b*, and optionally, an intermediate member 120. According to embodiments of the present invention, the housing shells 111*a* and 111*b* and/or the intermediate member 120 may be configured with an array of cavities. These cavities may enable interlocking of engagement means between the first housing shell 111*a* and the second housing shell 111*b*. As an illustration, projections on one or both housing shells 111*a* and 111*b* may be configured to engage with (e.g., fit and/or thread through) an array of cavities and received by the corresponding engagement means on the opposing housing shell and/or the intermediate member 120. As shown in the depicted example, first and second housing shells 111*a* and 111*b* may each comprise housing engagement means configured as protrusions 115, 116, 117, and 118. As shown in the depicted example, protrusions 115, 116, 117, and 118 may be formed in any suitable shape, including circular, rectangular, square, and/or any other shape, or any combination thereof, for example, protrusion 118 may be generally formed as a combination of rectangular and circular shapes. In some examples, any of the protrusions may be formed with an overhanging hook member. In some examples, the intermediate member 120 may include a multitude of nexus cavities, for example, cavities 124, 125, 126, 127, 128 and 129 corresponding to the protrusions of the housing shells 111*a* and 111*b*. The nexus cavities 124, 125, 126, 127, 128 and 129 may be hollowed or indented areas in the intermediate member through which the protrusions of the housing shells 111*a* and 111*b* thread and integrate with one another. Similar to the protrusions 115, 116, 117, and 118, the nexus cavities may be configured in any size and shape. In the illustrated embodiment, the nexus cavities are predominantly comprised of multiple, generally rectangular hollowed cavities. In addition, the nexus cavities may also include circular cavities or components.

A housing engagement means of the end cap 170 is shown in FIGS. 5-7. As shown in the depicted examples, a housing engagement means may comprise one or more recesses, for example, recess 175 (shown in FIG. 5), formed on a surface of the end cap 170 and adapted to slidably engage with one or more elongated protrusions (shown in FIG. 7) formed on at least a portion of the housing, for example, on one or more of the housing shells 111*a* and/or 111*b* or the intermediate member 120, for example, elongated protrusion 106 formed on the intermediate member 120. In some scenarios, a second protrusion 107 may be configured as a clip to support securement of the end cap 170 to the housing 110, for example, at the intermediate body member 120. In some embodiments, the second protrusion 107 supports engagement of the end cap 170 with the housing 110, even when the end cap 170 is in a "recess uncovering" position, for example, by abutting a portion of the end cap 170 and preventing the end cap from completely disengaging with the housing, for example, to prevent loose parts. The second protrusion 107 may include a pointed tip and may be configured as a "one way snap fit" to prevent the end cap 170 from fully disengaging from the housing 110, to "capture" the end cap 170. In some examples, the elongated protrusion(s) of the housing 110 may define a cap track upon which the end cap 170 may travel.

As further shown in FIGS. 5-7, a locking switch assembly of the end cap 170 may comprise a locking switch 171, and one or more switch grooves 172 and/or slots. In some examples, a switch 171 of the locking switch assembly may be disposed along an edge of the end cap 170. In some embodiments, the switch 171 may be configured to lock the end cap 170 in a position relative to the housing 110 of the foam board cutter 100. For example, the switch 171 may be configured to move to at least a first position wherein the switch 171 is received in a notch 119 formed in the housing, and a second position wherein the switch 171 is removed from the notch in the housing and is moved to a notch 172 in the end cap 170 to permit the end cap 170 to travel with respect to the housing 110. In some examples, in the locked position, the locking switch 171 may be configured to hold the end cap 170 in a recess-covering position (e.g., may prevent the end cap 170 from moving from a recess-covering position). In some examples, the locking switch 171 may be configured to be retained by the end cap 170, for example, even in an unlocked position. In some embodiments, in the unlocked position of the locking switch 171, the end cap 170 may be permitted to at least partially disengage from the housing 110 (e.g., the first and second housing shells 111*a* and 111*b*) such that the end cap 170 may be moved to uncover the recess(es) 122 formed in the housing 110 (e.g., the recess(es) formed between each of the rear portions of the first and second housing shells 111*a* and 111*b* and a rear portion of the intermediate member 120). In some examples, in the locked position, the locking switch 171 prevents movement of the end cap 170 with respect to the housing 110, whereas in the unlocked position, the locking switch 171 permits movement of the end cap 170 with respect to the housing 110, for example, to support removing a blade(s) 200, blade holder(s) 130 and/or slider button(s) 161 which may be removed through the recess(es) 122 formed in the housing 110.

As further shown in FIGS. 5-7, a lower body section of the intermediate member 120 may comprise one or more engagement cavities, for example, two disparate engagement cavities. In the depicted example, a first cavity 102 is formed in a generally triangular shape and a second cavity 103 is formed in a trapezoidal shape. In any embodiment, the cavities may be formed in any suitable shape, including, for example, square, rectangle, hexagon, circle, oval or any other shape. Though in the depicted example the cavities are dissimilar in shape, in some embodiments the engagement cavities may be similar in shape. The engagement cavities may be hollow so as to allow the engagement means of the housing shells 111*a* and 111*b* to pass through the intermediate member 120 and connect with or engage with an opposite housing shell. In the illustrated embodiment, the housing shells 111*a* and 111*b* compromise projections that the extend towards the intermediate member 120 and integrate within each other as described above. While not directly connecting the intermediate member 120, the engagement cavities may allow for the joining of the housing shells 111*a* and 111*b* with the intermediate member 120 in between them, enabling secure casing of the intermediate member 120, and including any other components, for example, optionally including the blade cartridges.

As further shown in FIGS. 5-7, a blade 200 may be disposed in the blade holder 130 of the blade cartridge assembly 150. The blade 200 may comprise a "spine" side 201 and a "belly" side 202 formed with a blade edge. One or more openings 203 may be disposed in a middle section of the blade 200 and/or one or more shaped notches 204, for example, four "U" shaped notches 204 may be formed along the "spine" side 201 of the blade 200. In any embodiment, a blade 200 may comprise any number of openings 203 and any number of notches 204.

Furthermore, in any embodiment, the shaped notches 204 may be configured in any suitable shape, for example, any shape corresponding to and adapted to fit shaped protrusions 133 formed on the arm extensions (for example, arm extension 131 and/or 132) of the blade holder 130. The blade 200 may be made from any suitable material, including, but not limited to, metal, ceramic, or any combination thereof. In a preferred embodiment, the blade 200 may be made from a ceramic material that is capable of withstanding extended use without becoming dull or unusable. Ceramic materials appropriate for such construction include, but are not limited to, zirconium oxide.

Figure 8:
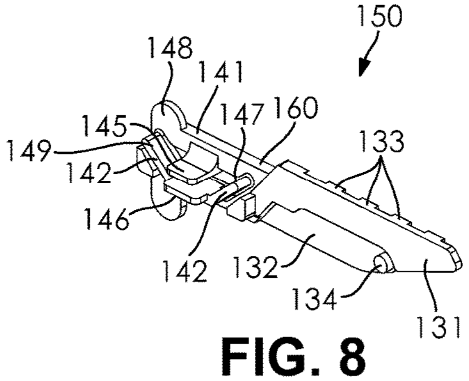
FIG. 8 is a first perspective view of a blade cartridge in accordance with embodiments of the present invention.
Figure 9:
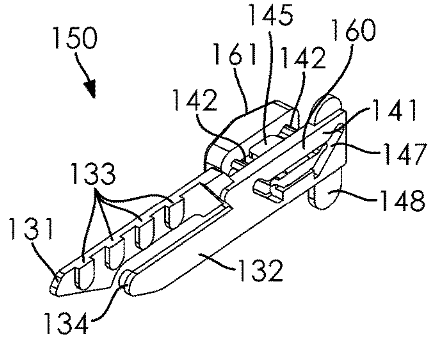
FIG. 9 is a second perspective view of a blade cartridge in accordance with embodiments of the present invention.
Figure 10:
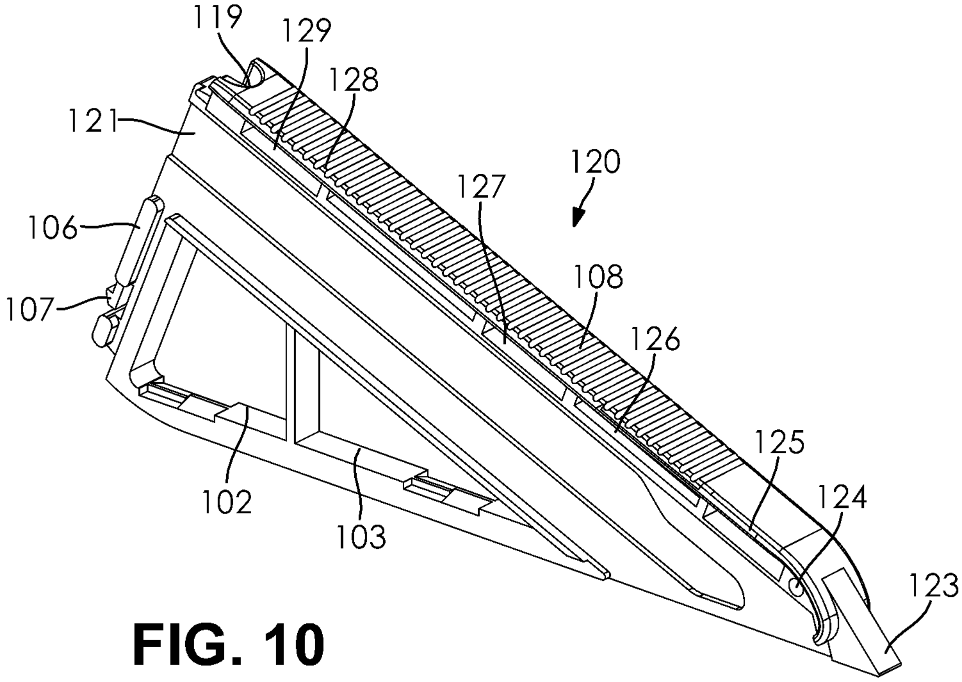
FIG. 10 is a first perspective view of an intermediate member in accordance with embodiments of the present invention.
Figure 11:
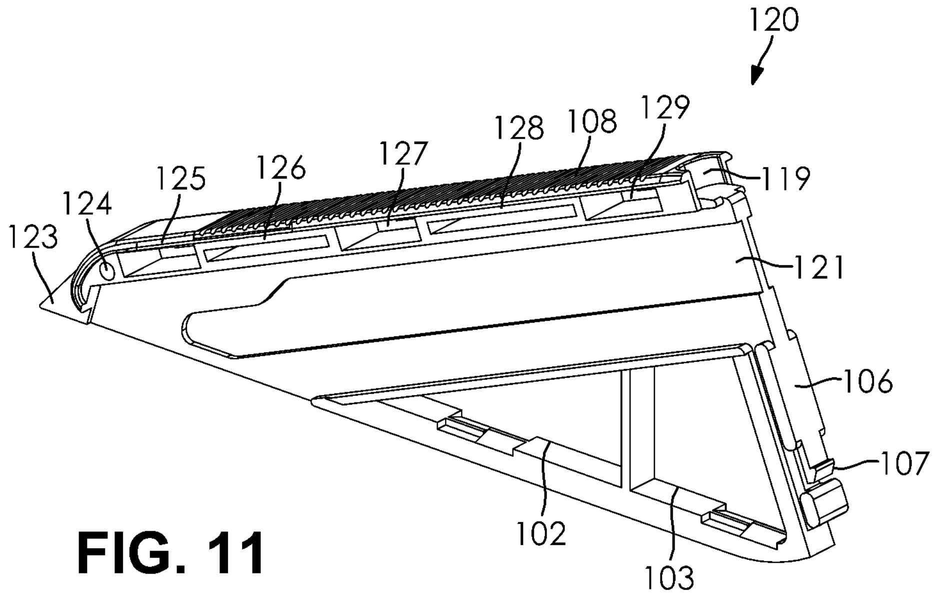
FIG. 11 is a second perspective view of an intermediate member in accordance with embodiments of the present invention.

FIGS. 8 and 9 depict exemplary blade cartridges (e.g., blade actuation mechanisms) of a foam board cutter in accordance with embodiments of the present invention. As shown in FIGS. 8-9, a blade cartridge assembly 150 may comprise a blade holder 130 and a slider button assembly 160. One end, for example, a front end, of a blade cartridge assembly 150 may comprise a blade holder 130 while the opposite end, for example, a rear end, of the blade cartridge assembly 150 may comprise a slider button assembly 160. A blade holder 130 may comprise one or more arm extensions (e.g., a pair of arm extensions). In some examples, a portion of the blade holder 130 (e.g., one or more arm extensions of the blade holder) may extend from a base plate 141 of the slider button assembly 160. The arm extensions of the blade holder 130 may be integrally formed with or configured to connect to the base plate 141 of the slider button assembly 160. In some examples, a first arm extension 131 may be configured to substantially abut a first side of a blade 200, for example, a first flat side of a blade 200 disposed between the "spine" and "belly" sides of a blade 200, and a second arm extension 132 formed to substantially abut a second flat side of a blade 200, for example, a second side disposed between the "spine" and "belly" sides of a blade 200. The arm extensions 131 and 132 may comprise substantially flat side or exterior faces to facilitate gliding across blade cartridge tracks configured on one or both of the housing shells 111 and/or the intermediate member 120, for example, blade cartridge track 121 configured on the intermediate member 120. The opposing first and second arm extensions 131 and 132 may function to hold a blade 200. In some embodiments, a blade 200 in a blade holder 130 may be supported by either or both of the arm extensions 131 and 132. In an illustrative example, a first arm extension 131 may be configured as an elongated member adapted to extend along or near a top edge (or "spine" side) of a blade 200, and may optionally be configured along or near additional edges or sides of a blade 200, for example, along or near a rear side of a blade 200. A first arm extension 131 may further comprise one or more shaped protrusions, for example, four "u" shaped protrusions 133, adapted to engaged with one or more notches, for example, four "u" shaped notches, disposed on a top side of a blade 200 to support holding and/or retaining a blade 200. In some examples, a second arm extension 132 may be configured as an elongated member adapted to extend along or near a middle section of a flat side of a blade 200. A second arm extension 132 may further comprise one or more protrusions, for example, one substantially cylindrical protrusion 134, adapted to be received in a receiving hole or cavity at a general center of a blade 200, to support holding and/or retaining a blade 200. Either or both of the arm extensions 131 and 132 may be substantially flexible or substantially rigid (depending on the intended application for the blade holder 130). For example, either or both of the arm extensions 131 and 132 may be configured to be flexible enough to bend at least to an extent necessary to release a blade 200 from either or both of the arm extensions 131 and/or 132, for example, by bending at least one of the arm extensions, for example, a second arm extension 132, to remove the shaped protrusion 134 from the receiving hole formed in the blade 200, and permit the release of the blade notches from within the shaped protrusions 133 of the first arm extension 131. The resulting configuration may be a blade 200 that may be positioned and releasably held in place by the blade holder 130 and whose position is reinforced by one or both arm extensions 131 and/or 132. In some embodiments, a single arm extension may be capable of performing the corresponding functions of the blade holder 130 for example, a single arm extension may be formed with one or more "u" shaped protrusions and, for example, one or more cylindrical protrusions to support connection to notches and/or receiving hole(s) formed in a blade 200.

As further shown in FIGS. 8-9, the base plate 141 of the slider button assembly 160 may comprise one or more shaped members 149. In an illustrative example, a shaped member 149 may extend from a surface of the base plate 141, for example, from a surface under the shaped opening 147, and may be formed in a generally wide "U" shape, such that the shaped member 149 includes a base portion, with two arm elements 142 extending therefrom. In some examples, each arm element 142 may define an engagement point which is configured to engage with the notches 114 (e.g., may be selectively received within the notches 114) of the slider button channel 113. In any embodiment, the arm elements 142 may be formed in any suitable configuration, including, one, two, three, four, or five engagement points adapted to engage with the notches 114 of the slider channel 112. In some examples, the base portion of the shaped member 149 may be formed of a material of predetermined flexibility (e.g., POM) configured to permit movement of at least a portion of the shaped member 149 relative to the base plate 141. For example, a flexible base portion of the shaped member 149 may permit arm element(s) 142 to selectively move towards (e.g., into) and away from (e.g., out of) an opening 147 formed in the base plate 141 of the slider button assembly 160. In some examples, a portion of the shaped member 149, for example, the arm elements 142 of the shaped member 149, may be biased outwards of the opening 147 in the base plate 141, and may be optionally directed towards the opening 147 in the base plate 141 by means of user force (e.g., a pressing or pushing force). In an exemplary usage scenario, a portion of the shaped member(s) 149, for example, at least a portion of the arm elements 142 of the shaped member(s) 149 may be adapted to engage with the slider channel 112, for example, to engage with the notches 114 disposed along the slider channel 112. In any embodiment, the opening 147 may be configured to receive at least a portion of the slider post 162 and/or at least a portion of the shaped member 149. For example, the opening 147 may be shaped to correspond to the shape of the slider post 162 and/or the shaped member 149, for example, in a generally wide "U" shape.

In some scenarios, one or more wing elements 164 and 165, for example, a pair of wing elements may extend from a top and/or side surface of the slider post 162. As shown in FIG. 9, the wing elements 164 and 165 may be configured to be disposed in close proximity to the arm elements 142 of the shaped member 149 in an assembled slider assembly 160. In an exemplary usage scenario, upon engagement of the slider button 161 (e.g., upon application of a downward or sideways force on the slider button 161), the wing elements 164 and 165 may be configured to substantially abut, push against and/or displace at least one of the arm elements 142 out of a notch 114 which such arm element(s) may have been disposed, for example to permit movement of the slider assembly 160.

In some examples, slider support member(s) 145 and 146 may be provided to support and/or stabilize compression of the slider button 161 and/or to prevent total compression of the slider button 161 towards the base plate 141. In some examples, the slider support member(s) 145 and 146 may be further configured to engage with post elements 163 protruding from the slider post 162. For example, such engagement may involve the abutment of post elements 163 against the support members 145 and 146 when the slider button 161 is at rest (e.g., not compressed) to prevent the slider post 162 from exiting or disengaging from the opening 147 formed in the base plate 141. In other words, the post elements 163 may be configured to support securement of the slider button 161 and/or slider post 162 to the base plate 141 by preventing the slider post 162 from exiting the opening 147 formed in the base plate 141. In some examples, a slider support member 146 may be formed with or extend from the base portion of the shaped member 149. In some examples, the base plate 141 may further comprise a glider component 148 configured to support smooth gliding of the slider assembly within the housing. In some examples, a glider track may be formed on the intermediate member 120 and may be configured as a pathway for the glider component 148. In the depicted example, the glider component 148 is generally formed in the shape of an oval, however, in any embodiment, the glider component 148 may be formed in any similarly suitable shape, including circular, square, rectangular or any other suitable shape.

In some examples, a slider button 161 may be configured as a push button which may be configured to selectively permit movement of the slider button 161 (and, for example, a blade/blade holder operably connected thereto) relative to the housing. For example, when the slider button 161 is compressed and a portion of the shaped member(s) 149, for example, the arm elements 142 (e.g., engagement points) of the base plate 141 are disengaged (e.g., removed) from the notches 114 of the slider channel 112, the slider assembly 160 (and a blade holder 130 and/or blade 200 operably connected thereto) may be unlocked and permitted to move within the channel 112 (e.g., translate left and right with respect to the housing 110) to optionally extend and/or retract a blade 200. Additionally or alternatively, when the slider button 161 is pushed towards one side or the other of the slider channel 112, a portion of the slider post 162, which may loosely fit within the opening 147, may be configured to move at least one of the arm elements 142 of the base plate 141 to disengage such arm element(s) 142 from the notches 114 within which the arm element(s) 142 may have been disposed to unlock the slider button 161 and enable the slider button 161 to move in the direction of the pushing force. Moreover, for example, in a scenario where two arm elements 142 are present, once one of the arm elements 142 are disengaged from the notches 114, the other arm element's engagement with the notches may not prevent the slider assembly 160 from translating with respect to the slider channel 112. Furthermore, for example, when the slider button 161 is released and/or when the button 161 is at rest, a portion of the arm element(s) 142 (e.g., engagement points) engage with (e.g., are received by) the notches 114 of the slider channel 112, the slider button assembly 160 (and the blade holder 130 and/or blade 200 operably connected thereto) may be prevented from moving, thereby permitting the locking of a blade 200 in one or more selected retracted or extended positions, for example, while the cutter 100 is in use during a cutting operation. As shown in the depicted example, a pair of arm elements 142 of a may be configured to simultaneously engage with a pair of notches 114 of the slider channel 112 to lock the slider assembly 160 in a selected user position. Moreover, the arm elements 142 may be configured to simultaneously disengage from any of the notches 114 of the slider channel 112 to unlock the slider assembly 160 from a given position, and permit movement of the slider assembly 160 and, for example, a blade 200 operably connected thereto.

In accordance with some embodiments, applying pressure to a slider button 161 (e.g., slider button 161*a* or 161*b*), for example, by pressing down on a slider button 161 and/or pushing the slider button 161 towards a first direction or a second direction along a slider channel 112, may direct a portion of the slider assembly 160 to at least partially disengage from a slider channel 112 (e.g., slider channel 112*a* or 112*b*) and permit movement of the slider button 161 and/or blade cartridge assembly 150 relative to the housing 110, for example, to move a blade 200 with respect to the housing 110. In some examples, a blade 200 may translate to move from a variety of retracted and extended blade positions. In some examples, upon release of a slider button 161 (e.g., removal of a pressing and/or directional force on the slider button 161) a base plate 141 of the slider assembly 160 may lock into a position relative to the housing 110, for example, to lock a blade 200 operably connected to the slider assembly 160 in a retracted or extended position relative to the housing 110. In some examples, one or more protrusions 142 defining one or more engagement points of the slider assembly 160 may be received in notches 114 formed in the slider channel 112 to prevent the slider button assembly 160, and, for example, a blade 200 operably connected thereto, from moving or translating with respect to the housing 100, for example, to lock a blade 200 in a desired retracted or extended position, as desired by a user.

In accordance with embodiments of the present invention, the blade cartridge assemblies may be identical in configuration. However, in alternate or additional embodiments, the blade cartridge assemblies may be disparate. As one example, the blade cartridge assemblies hold the same type of blade. Yet alternate embodiments may include blade cartridge assemblies capable of holding different types of blades.

In accordance with an exemplary usage scenario, a foam board cutter 100 may be utilized to create channel cuts on a foam board. For example, dual blades 200 of a foam board cutter 100 may be used in unison to create two distinct and parallel cuts in a foam board. In some examples, both blade cartridge assemblies 150 may be positioned in corresponding positions, for example, by aligning each slider button 161 to a predetermined position on the slider channel 112. An indicator groove, for example, "channel" cut groove 105, formed on an exterior face of the housing shells may designate a predetermined position for parallel cutting (e.g., positioning of both slider switches in a position corresponding to a "parallel" cut indicator grove disposed near the slider track). Once the parallel cuts are formed on a surface of the foam board, a "nose" or lifting tool 123 may be utilized to dig, tool and/or "plow" between the cuts to form a channel in the foam board, for example, to scrape out foam between the two cuts and/or to create a gap in the foam board between the two cuts. The two cuts may then form the boundary for the channel formed in the foam board.

Figure 12:
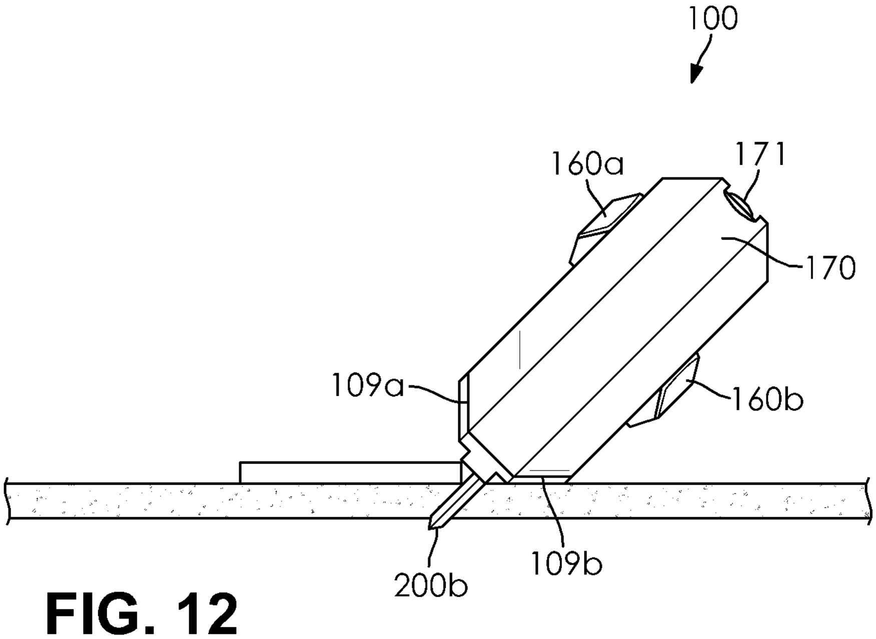
FIG. 12 is a rear view of an exemplary foam board cutter in use in accordance with embodiments of the present invention.

FIG. 12 depicts an exemplary usage scenario of an exemplary foam board cutter. As shown in FIG. 12, each of the blades 200 of the foam board cutter 100 may be configured to independently form 45° cuts on a foam board, for example, to enable ambidextrous use of the foam board cutter in making 45° cuts. In some examples, a selected slider assembly 160 (e.g., a left or right slider assembly) may be moved to a position corresponding to a 45° cut position on the slider switch channel 112, while a second slider assembly 160 remains in a retracted position. For example, a right-handed user may move a right blade cartridge assembly 150 to a position corresponding to a 45° cut position designated by a corresponding groove disposed near a predetermined position along the right slider channel 112 of a relevant housing shell. As shown in the depicted example, a user may tilt the foam board cutter 100 to the right, such that an angled face of a bottom side of a housing shell 111 abuts or rests against the surface of a cutting material to enable 45° cutting relative to a surface of the cutting material, for example, a foam board or cardboard. Similarly, a left-handed user may move a left blade cartridge assembly to a position corresponding to a 45° cut position designated by a corresponding groove disposed near a predetermined position along the left slider channel 112 of a relevant housing shell 111. A user may tilt the foam board cutter 100 to the left, such that an angled face of a bottom side of a housing shell 111 abuts or rests against the surface of a cutting material to enable 45° cutting relative to a surface of the cutting material, for example, a foam board or cardboard. In some examples, a bottom side of the foam board cutter 100 may be specifically configured with one or more angled faces 109 to support making such and similar angled cuts along a foam board (e.g., to support a user in making 45° cuts relative to a surface of a foam board, for example, by creating a limit the extent the foam board cutter 100 may be tilted, for example, to a right or left side). In any example, a ruler or similar tool may be utilized in conjunction with the foam board cutter 100 as a guide to make straight cuts, including, for example, straight 45° cuts.

As further demonstrated by FIG. 12, in some examples, a bottom side of each of the first and second housing shells 111*a* and 111*b* may be formed with one or more angled faces, for example, angled faces 109*a* and 109*b*, respectively, for example, to support the creation of angled cuts, for example, 45° cuts, along a foam board (e.g., to support a user in making 45° cuts relative to a surface of a foam board, for example, by creating a limit the extent the foam board cutter 100 may be tilted, for example, to a right or left side during a given cutting operation).

In accordance with another exemplary usage scenario, each blade may be used independently of the other blade to create 90° cuts (e.g., cuts which are substantially perpendicular to the surface of a foam board) in a foam board. For example, a user may move a blade cartridge assembly 150 to a desired extended blade position (e.g., anywhere from a slightly extended blade position to a fully extended blade position). In some scenarios, a right-handed user may choose to extend a left blade 200 to a chosen extended blade position in order to make 90° cuts, for example, such that the user may be able to follow a guide line drawn on a foam board. In some scenarios, it may be easier and/or more convenient for a right-handed user to use a left-hand blade 200 of the foam board cutter 100 to make single 90° cuts. Likewise, it may be easier for a left-handed user to use a right-hand blade 200 of the foam board cutter 100 to make 90° cuts.

In some scenarios, the blade(s) 200 disposed in the blade cartridge(s) 150 may be reoriented or replaced by disengaging any blade(s) 200 within the blade holder 130 of the blade cartridge assemblies 150, for example, by bending or flexing one or both of the arm extensions 131 and/or 132 to disengage portions of the arm extensions 131 and/or 132 from the notches 203 and/or receiving holes 203 formed in the blade(s) to enable removal of the blade(s) 200 from within the blade holder(s) 130. New or reoriented blades 200 may then be engaged with the blade cartridge(s) 150, for example, by bending or flexing one or both of the arm extensions 131 and/or 132 to allow for placement of the blade(s) 200 within the blade holder 130, for example, into a position where portions of the arm extensions 131 and/or 132 are received within the notches 204 and/or receiving holes 203 of the blade(s) 200.

Though the cutter referenced herein is generally referred to as a "foam board cutter", it is to be understood that the invention contemplated hereby may be utilized to cut materials other than foam boards including all grades of paper, cardboard, mat boards, foam boards, fabrics, plastics, sheets of metal, and other materials.

According to embodiments of the present invention, the blade that is used may be constructed from a ceramic material that is capable of withstanding extended use without becoming dull or unusable. Ceramic materials appropriate for such construction include, but are not limited to, Zirconium Oxide. One of ordinary skill in the art would appreciate that there are numerous ceramic materials that could be utilized with embodiments of the present invention.

According to an embodiment of the invention, one or more of the blade holder, the locking sleeve, or any parts thereof, may be formed from a suitable thermoplastic material, which may include, for example, Acrylanitrile Butadiene Styrene (ABS), Polycarbonate (PC), Mix of ABS and PC, Acetal (POM), Acetate, Acrylic (PMMA), Liquid Crystal Polymer (LCP), Mylar, Polyamid-Nylon, Polyamid-Nylon 6, Polyamid-Nylon 11, Polybutylene Terephthalate (PBT), Polycarbonate (PC), Polyetherimide (PEI), Polyethylene (PE), Low Density PE (LDPE), High Density PE (HDPE), Ultra High Molecular Weight PE (UHMW PE), Polyethylene Terephthalate (PET), PolPolypropylene (PP), Polyphthalamide (PPA), Polyphenylenesulfide (PPS), Polystyrene (PS), High Impact Polystyrene (HIPS), Polysulfone (PSU), Polyurethane (PU), Polyvinyl Chloride (PVC), Chlorinated Polyvinyl chloride (CPVC), Polyvinylidenefluoride (PVDF), Styrene Acrylonitrile (SAN), Teflon TFE, Thermoplastic Elastomer (TPE), Thermoplastic Polyurethane (TPU), Engineered Thermoplastic Polyurethane (ETPU), or any combination thereof.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A cutting device, comprising:

a first blade cartridge assembly configured in parallel position to a second blade cartridge assembly, wherein each blade cartridge assembly comprises a blade holder configured to retain a blade and a slider button assembly configured to move along a slider track, wherein each blade cartridge assembly operates independently of the other blade cartridge assembly;

a slider button having a slider post extending from a bottom surface thereof, the slider post comprising a pair of wing elements extending from opposing side surfaces thereof; and a base plate with a shaped opening configured to receive the slider post, a shaped member in a wide "u" shape, comprising a pair of arm elements extending from a flexible base portion which extends from a surface of the base plate, and wherein a portion of the shaped member is configured to move relative to the shaped opening.

2. The cutting device of claim 1, wherein each blade cartridge assembly is able to function side-by-side and simultaneously with the other blade cartridge assembly.

3. The cutting device of claim 1, wherein the slider post loosely fits within the shaped opening of the base plate and upon application of a force on the slider button, the wing elements are adapted to move the arm elements, and wherein the arm elements of the base plate are configured to selectively engage with notches disposed on the slider channel of a housing of the cutting device to selectively lock the slider assembly in a user selected position along the slider track.

4. A cutting device, comprising:

a housing comprising:

one or more blade cartridge assembly tracks, each track comprising a slot having an interior top boarder with a plurality of notches;

a first housing shell connected to a second housing shell; and an intermediate member between the first housing shell and the second housing shell, wherein a rear end of the intermediate member extends beyond the first housing shell and the rear comprises one or more elongated protrusions to which an end cap is configured to slide along in a vertical direction, the end cap being selectively detachable from the intermediate member; and a pair of blade cartridge assemblies, each blade cartridge assembly of the blade cartridge assemblies being adapted to engage with one of the one or more blade cartridge assembly tracks, each blade cartridge assembly further comprising:

a slider button assembly comprising a base plate adapted to engage with a slider button having a slider post adapted to travel through at least one of the slots of the blade cartridge assembly tracks, the base plate having a shaped opening and a shaped member with two engagement ends, each engagement end configured to be selectively received by the notches of the blade cartridge track to selectively lock the slider button assembly in a user-selected position relative to the blade cartridge track; and a blade holder adapted to receive a blade.

5. The cutting device of claim 4, wherein the pair of blade cartridge assemblies are configured in a parallel position and to be deployable simultaneously.

6. The cutting device of claim 4, wherein at least a portion of the slider post and at least a portion of the shaped member are configured to be received within the shaped opening of the base plate.

7. The cutting device of claim 4, wherein a first blade cartridge assembly of the pair blade cartridge assemblies is aligned on a first side of the intermediate member and a second blade cartridge assembly of the pair blade cartridge assemblies is aligned on a second side of the intermediate member.

8. The cutting device of claim 7, wherein detaching the end cap enables each of the blade cartridge assemblies to be removed from between the housing shells and the intermediate member.

9. The cutting device of claim 8, wherein a top edge of the intermediate member is includes a notch adapted to receive a locking switch of the end cap to lock the end cap in a secured position on the rear of the intermediate member.

10. The cutting device of claim 7, wherein each blade cartridge is positioned on a side of the intermediate member, and the intermediate member comprises a pair of grooves on each such side, upon which each blade cartridge is able to move to stably extend or retract either of the blades from the housing.

11. The cutting device of claim 4, wherein a first blade cartridge assembly of the pair of blade cartridge assemblies facilitates a 45 degree angle cut in a first direction relative to a cutting surface and a second blade cartridge assembly of the pair of blade cartridge assemblies facilitates a 45 degree angle cut in a second direction relative to the cutting surface.

12. A foam board cutter comprising:

a body member comprising:

a first housing shell and a second housing shell, the first housing shell and second housing shell each comprising a slider button track having a slot with an interior boarder that includes a plurality of notches;

an intermediate member disposed between and configured to support connection of the first housing shell and the second housing shell, the intermediate member comprising a first face facing the first housing shell and a second face facing the second housing shell, the first face and the second face each comprising a blade cartridge assembly groove;

a first gap between the first face of the intermediate member and the first housing shell;

a second gap between the second face of the intermediate member and the second housing shell, wherein the first gap and the second gap each define an opening in a rear portion of the body member; and a removable end cap configured to selectively attach to a rear end of the body member to cover the first gap and the second gap; and a pair of blade cartridge assemblies, wherein one blade cartridge assembly of the pair of blade cartridge assemblies is removably disposed in each of the first gap and the second gap, each of the blade carriage assemblies further comprising:

a slider button assembly comprising a base plate adapted to engage a slider post of a slide button adapted to travel along the slot of the slider button track, the base plate having a shaped member with at least two notch engagement ends, each notch engagement end of each slider button assembly configured to be selectively received by the notches of its respective slider button track to selectively lock each slider button assembly in a selected position relative to its respective slider button track; and a blade holder extending from an end of the slider button assembly and configured to retain a blade.

13. The foam board cutter of claim 12, wherein a first blade cartridge assembly of the pair blade cartridge assemblies is configured to travel within the first gap along a first blade cartridge assembly groove on the intermediate member and a second blade cartridge assembly of the pair blade cartridge assemblies is configured to travel within the second gap along a second blade cartridge assembly groove on the intermediate member.

14. The foam board cutter of claim 12, wherein the blade holder comprises a first arm extension comprising one or more "u" shaped protrusions and a second arm extension comprising a cylindrical protrusion configured to be received in a receiving hole of the blade.

15. The foam board cutter of claim 12, further comprising a lifting tool on a front end of the intermediate member.

16. The foam board cutter of claim 12, wherein each slider button assembly further comprises:

a pair of wing elements extending from opposing side surfaces of the slider post; and a shaped opening in the base plate;

wherein the shaped member is a wide "u" shape and comprises a pair of arm elements extending from a flexible base portion which extends from a surface of the base plate, each arm element comprising at least one notch engagement end, and wherein at least a portion of the shaped member configured to be received by the shaped opening.

17. The foam board cutter of claim 16, wherein the slider post loosely fits within the shaped opening of the base plate and upon application of a force on the slider button, the wing elements are adapted to move the arm elements and disengage the arm elements from the notches of the slider track to selectively permit movement of the blade cartridge assemblies.

* * * * *